Patented Aug. 22, 1939

2,170,124

UNITED STATES PATENT OFFICE 2,170,124

COMPOUNDS OF THE ANDROSTANE AND PREGNANE SERIES AND METHODS OF PRODUCING THE SAME

Adolf Butenandt, Berlin-Lichterfelde, and Willy Logemann, Berlin-Charlottenburg, Germany, assignors to Schering Aktiengesellschaft, a corporation of Germany No Drawing. Application December 5, 1936, Serial No. 114,334. In Germany December 7, 1935

25 Claims. (Cl. 260—397)

This invention relates to compounds of the androstane and pregnane series and methods of producing the same.

One feature of the present invention concerns a process which allows of the conversion of unsaturated compounds of the androstane and pregnane series which contain a methylene group in the position adjacent to the carbon to carbon double bond, into derivatives richer in oxygen, in which the methylene group is replaced by a keto group.

By "compounds of the androstane and pregnane series", as employed in this specification and in the appended claims, are meant the saturated and unsaturated keto and hydroxy compounds and compounds having substituents, like acid and ether and other groups, which can be replaced by the hydroxy group, which compounds are derived or are derivable from the hydrocarbons androstane and pregnane having the formulae

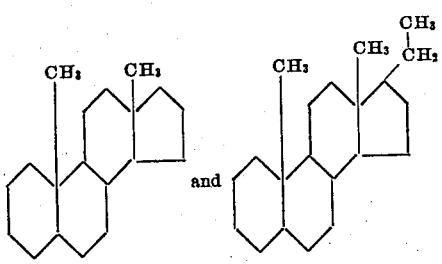

respectively, said derived compounds retaining the cyclopentano-dimethyl-polyhydrophenanthrene structure of the theoretically parent substances.

The process according to this feature of the invention consists in subjecting unsaturated compounds of the androstane and pregnane series, which possess in the position adjacent to the carbon to carbon double bond a methylene group, to the action of oxidising agents without protection of the double bond.

To the unsaturated compounds of the androstane and pregnane series coming into consideration as starting materials for this process belong in particular dehydroandrosterone, androstendiols, pregnenolones and the like.

The starting materials containing oxygen can either be employed as such in the form of the free alcohols or ketones, or suitably and with the production of better yields in the form of their corresponding derivatives; the reaction products obtained in the form of their derivatives can then be converted if desired according to known methods by hydrolysis and the like into the fundamental free compounds. When a starting material is employed which contains hydroxyl groups, and it is desired that the originally present hydroxyl groups remain unchanged in the oxidation product, it is advantageous to convert these hydroxyl groups for protection from the action of the oxidising agent by esterification, etherification, halogenation or the like into groups which by hydrolysis or the like can be reconverted into a hydroxyl group.

For the oxidation treatment in this process all such agents can be employed as are capable of converting a methylene group in the position adjacent to a carbon to carbon double bond into a keto group; to these belong, for example, compounds of hexavalent chromium such as chromium trioxide and the like and further selenium dioxide and others; in the latter case the process is advantageously conducted in the presence of catalysts such as iodine and the like. The oxidising agents are suitably employed in large excess.

The products produced in this oxidation process are worked up suitably in such a manner that at first the likewise produced acid portions are separated in known manner from the neutral portions and thereupon from the latter the desired oxidation products isolated according to known physical or chemical methods. There is employed for this purpose, for example, fractional crystallisation of the oxidation products or suitable derivatives thereof or fractional sublimation or distillation suitably in high vacuum. It is, however, also possible to proceed in such a manner that the desired reaction products are converted into difficultly soluble derivatives by reaction with suitable reagents, for example, the known ketone reagents semicarbazide and so on and thus precipitated.

The process of this feature of the invention may be illustrated in greater detail by means of the following formulas relating to dehydro-androsterone:

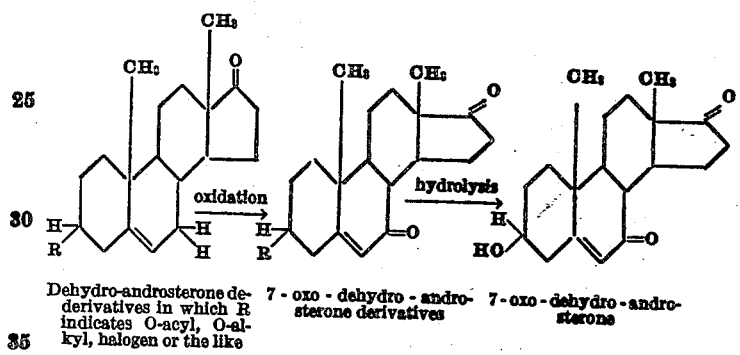

Dehydro-androsterone de-   7 - oxo - dehydro - andro-   7 - oxo - dehydro - andro-
rivatives in which R       sterone derivatives           sterone
indicates O-acyl, O-al-
kyl, halogen or the like By the above process there are produced in particular such derivatives richer in oxygen of unsaturated compounds of the androstane and pregnane series as contain at least 3 oxygen atoms directly connected to the carbon atoms of the androstane or pregnane system and as contain in the position adjacent to the carbon-carbon double bond a keto group.

According to a further feature of the present invention reduction products are produced of these specified unsaturated derivatives containing keto groups of compounds of the androstane and pregnane series, as are obtainable, for example, according to the above process or by other methods.

As starting materials for this second process come into consideration, for example, the 7-oxo- and 7-hydroxy-androstenolones, the 7-oxo- and 7-hydroxy-androstendione and also the different isomeric 7-oxo- and 7-hydroxy-androstendiols, the corresponding unsaturated 7-oxo- and 7-hydroxy-pregnane compounds, their derivatives and similar substances. There can also be employed as starting materials, however, the corresponding saturated compounds such as the 7-oxo- and 7-hydroxy-androstanolones, 7-oxo- and 7-hydroxy-androstandiones, 7-oxo- and 7-hydroxy-pregnanolones and the like and also their derivatives. Instead of the 7-oxo- or 7-hydroxy-compounds mentioned the corresponding 6-oxo- or 6-hydroxy-compounds, for instance, may likewise be used as starting materials.

For the manufacture of reduction products of these substances it is possible to proceed in the following manner:

If, for example, only the keto groups present in the starting material are required to be reduced and the carbon-carbon double bond to remain unaltered, then suitably a reducing agent is employed of the type of aluminium isopropylate or the substance to be reduced is treated, for example, with such Grignard compounds as incline to the formation of unsaturated hydrocarbons, for example, with isopropyl magnesium halogenide and the like.

If on the other hand the carbon-carbon double bond of the unsaturated starting material containing keto groups is to be hydrogenated, then suitably there is selected as hydrogenating catalyst a noble metal catalyst such as platinum, platinum oxide, palladium or nickel or an alloy skeleton catalyst of the type of the Raney catalyst and the like.

In the present case in which there is concerned in the reduction among others the hydrogenation of carbon-carbon and carbon-oxygen double bonds in conjugation to one another, there can be employed for the saturation of the carbon-carbon double bond also nascent hydrogen as is obtained, among other ways, by the action of alkali metals on alcohols, or such substances are employed as themselves easily give off hydrogen as, for example, alkali alcoholates or the like.

In the cases in which a hydrogenation of the carbon-carbon double bond takes place there can further also occur a reduction of any keto groups present.

In the application of catalytic methods there are of influence on the reduction product obtainable in any particular case in addition to the type of the catalyst itself and the method of manufacture thereof, the temperature employed in the hydrogenation, the quantity of hydrogen, the pressure of the hydrogen, the duration of the treatment and the solvent employed in the hydrogenation; in this connection see, for example, the remarks in Houben-Weyl, Methoden der organischen Chemie, vol. 2, second edition, 1933, page 373, et seq. The conditions suitable for the desired course of the hydrogenation can accordingly easily be established by corresponding experiments.

The various reduction possibilities may be illustrated in more detail by the following formulas employing as an example the 7-oxo-androstendiol:

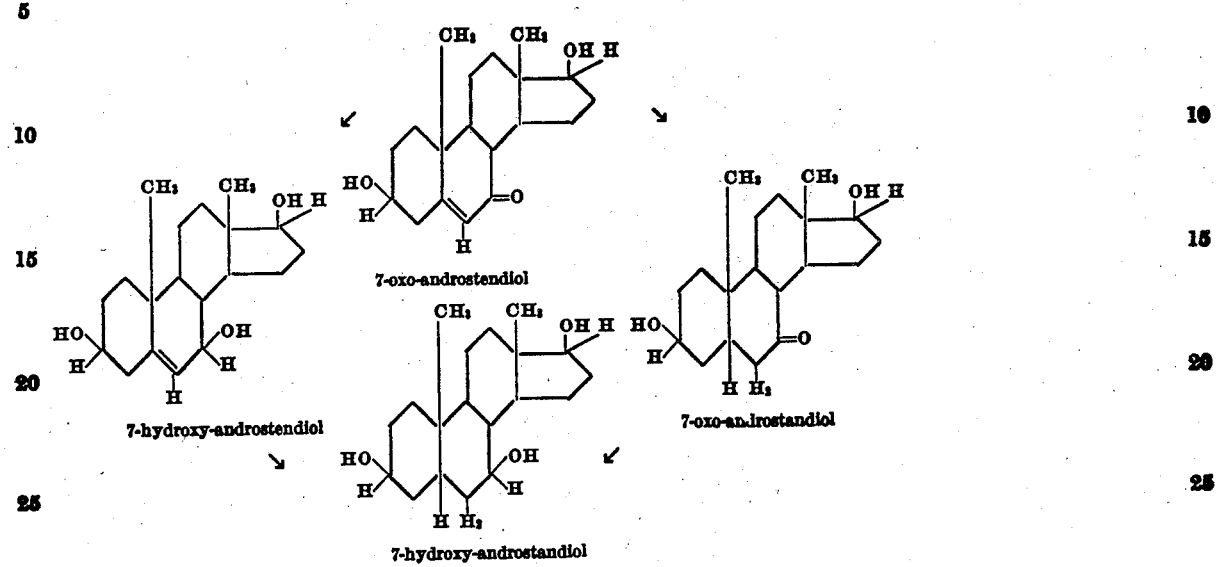

According to a still further feature of this invention, in compounds such as, for example, those which can be obtained according to the above processes, insofar as they contain at least one hydroxyl group, a carbon-carbon double bond can be introduced when they are subjected to the action of agents splitting off water. For this purpose are suitable the known water splitting agents such as are described, for example, in Houben-Weyl, Methoden der organischen Chemie, vol. 2, second edition, page 744 et seq., 1922. In this way double bonds can be introduced between the 2 and 3, 6 and 7, 16 and 17, and 17 and 13 carbons.

Instead of the compounds containing free hydroxyl groups there can be employed with advantage as starting materials also their inorganic or organic esters and these subjected to the action of acid splitting agents. In the cases in which the hydroxyl group to be split off is esterified by halogen hydride, there can be employed for the purpose of splitting off of hydrohalic acid alkaline agents such as pyridine, quinoline and the like.

As starting material comes into consideration, for example, $\Delta^5$-androstentriol-3,7,17, which can be obtained in any suitable manner, for example, by reduction of $\Delta^5$-7-oxo-androstendiol-3.17, as described above.

Instead of the free alcohol there can also be employed with particular advantage its ester, as, for example, the corresponding tribenzoate, as starting materials; there is then obtained by the process according to the invention with splitting off of 1 mol of acid the corresponding doubly unsaturated diester, from which the $\Delta^5$-$\Delta^7$-androstandiendiol-3.17 can be obtained by hydrolysis.

By employing as starting material for the present process a $\Delta^5$-7-oxo-androstendiol-3.17 or its diacetate as can be obtained, for example, as described above, there is obtained according to this process a $\Delta^3$-$\Delta^5$-androstandienol-17-one-7.

The process of this feature of the invention may be illustrated by means of the following formulas; in these formulae X indicates a hydroxyl group or an acid radical:

I.

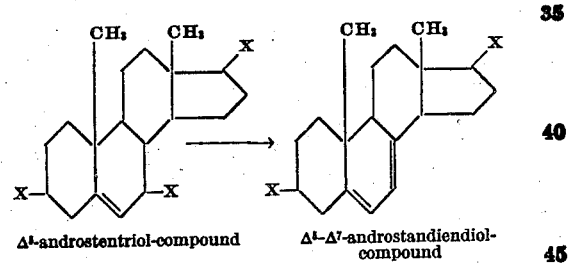

$\Delta^5$-androstentriol-compound $\qquad$ $\Delta^5$-$\Delta^7$-androstandiendiol-compound

II.

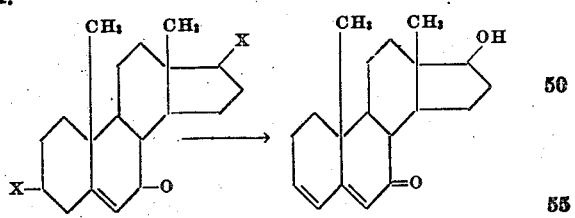

$\Delta^5$-7-oxo-androstendiol-compound $\qquad$ $\Delta^3$-$\Delta^5$-androstandienol-17-one-7

The following examples serve to illustrate the invention without, however, limiting the same to them:

*Example 1*

5.5 grams of androstendiol diacetate produced from androstendiol by acetylation are dissolved in 70 ccs. of glacial acetic acid and heated to 55° C. Then with stirring a solution of 4 grams of chromium trioxide in 2.5 ccs. of water and 2.5 ccs. of glacial acetic acid is allowed to drop in within two hours. Finally, the whole is heated for 2 hours further to about 50–55° C. The chromic acid has after this time been practically completely consumed. The remainder is destroyed by the addition of a few ccs. of methyl alcohol at 40–50° C. The reaction solution is poured into 600 ccs. of water and extracted twice each time with 500 ccs. of benzene. The benzene extracts are washed with water until the washing water is neutral. The product is then separated with N-caustic soda lye into an acid and neutral portion. The benzene layer, which contains the neutral portion, is washed with water and dried with magnesium sulphate. After the evaporation of the benzene there remains a residue which is recrystallised from methanol. 1.6 grams of Δ⁵-7-oxo-androstendiol diacetate-3.17 of M. P. 219–220° C. are produced. From the mother liquor can be isolated products still more rich in oxygen.

500 mg. of Δ⁵-7-oxo-androstendiol diacetate-3.17 are for the purpose of saponification dissolved in 50 ccs. of 2 N sodium methylate solution and heated for 30 minutes to weak boiling; then the reaction solution is diluted with water and extracted with ether in the customary manner. The residue remaining after the evaporation of the ether is recrystallized from acetone-petrol ether. There is thus obtained the Δ⁵-7-oxo-androstendiol-3.17 from alcohol in prisms of melting point 201° C. The optical rotation $$[\alpha]_D^{20°}$$

amounts to $-132.8°$ (in alcohol); the maximum of the absorption is at $238\mu$.

Instead of the androstendiol diacetate there can be employed for the oxidation also other androstendiol diesters, for example, the androstendiol dibenzoate or androstendiol acetate benzoate or the like. Also the esters of androstenolones or pregnenolones can be oxidised in an analogous manner.

Example 2

0.4 gram of androstendiol monoacetate of M. P. 142–143° C. is suspended in 20 ccs. of glacial acetic acid, treated with a solution of 0.46 gram of chromium trioxide in a trace of water and violently shaken for 10 hours. The reaction solution initially becomes somewhat heated and the starting material passes gradually into solution. After a further 12 hours standing the solution is treated with 200 ccs. of water and extracted three times with ether. The ether extract is washed with water and sodium carbonate solution and after drying over sodium sulphate evaporated. The yellow colored solid residue from the ethereal solution is sublimed at 130–140° C. in a high vacuum and recrystallised from alcohol to a constant melting point of 198–201° C. Yield 83.7 mg.=20.2% of the theory.

$$[\alpha]_D^{22°} = 47.2° \pm 1.4° \text{ (in acetone).}$$

The product obtained corresponds to the 6-oxo-testosterone acetate.

For the purpose of saponification of the 6-oxo-testosterone acetate to the free alcohol a 0.1% solution of the acetate in 0.1% anhydrous methyl alcoholic hydrochloric acid is heated to boiling for 2 hours on the water bath, considerably concentrated in vacuum, treated with water and extracted with ether. After the evaporation of the ether there remains a red colored oil which is purified by sublimation in high vacuum at 140–150° C. and by recrystallisation from acetone-ether; long white needles of M. P. 203–205° C.

$$[\alpha]_D^{22°} = -58° \text{ (in acetone).}$$

Yield: from 51.6 mg. of acetate 18.4 mg. of 6-oxo-testosterone are obtained (40% of the theory).

The 6-oxo-testosterone can also be obtained without high vacuum distillation. If the yellow residue from the ethereal solution is dissolved in 95% alcohol and allowed to stand for some time there is obtained a white flocculent precipitate which can be removed by filtration; after concentration of the alcoholic solution the 6-oxo-testosterone crystallises in yellow prisms, and after further concentration there separates a mixture of yellow prisms and white needles. By extraction of this mixture of substances with a little ether, the white needles which are easily soluble in ether can be separated from the yellow prisms. The two fractions which crystallise of a yellow color are combined; they consist of 6-oxo-testosterone and can be purified by recrystallisation from alcohol. The residue of the ether extract by repeated crystallisation from alcohol yields the white needles in pure form; they melt at 229–231° C. but only become completely liquid at 239–241° C.

$$[\alpha]_D^{22°} = -29.9° \pm 1.3° \text{ (in acetone).}$$

The product obtained on the basis of the carbon-hydrogen determination in all probability constitutes the androstandione-(3.6)-diol-(5.17)-monoacetate-17.

Example 3

1.4 grams of chromium trioxide are dissolved in a trace of water and added to a solution of 1 gram of dehydro androsterone in 45 ccs. of glacial acetic acid. The reaction solution is shaken over night, then diluted with water and extracted with ether. The ethereal solution, after washing with sodium carbonate solution and water, is dried over sodium sulphate and evaporated; the yellow colored residue is recrystallised several times from alcohol; from the mostly yellow crystallisate a small quantity of a compound crystallising in white rosettes can be dissolved out. The yellow prisms (androstentrione) melt at 216–217° C. and exhibit a rotation $$[\alpha]_D^{22°} = +42.1° - 1.4° \text{ (in acetone).}$$

Yield about 25%. Its oxime is obtained in the following manner:

21.6 mg. of androstentrione, 60 mg. of hydroxylamine hydrochloride and 100 mg. of sodium acetate are dissolved in about 80% alcohol and heated under reflux for 4 hours. The reaction solution is treated with water and extracted with ether; the portions soluble in ether separate from dilute alcohol in an amorphous condition; they are obtained crystalline from ether and petrol ether but do not exhibit a sharp melting point but sinter at 188° C. and decompose gradually at 235–237° C. at which point complete melting with decomposition takes place.

In an oxidation of 2 grams of dehydro androsterone by the above described method 38.8 mg. of the white crystallisate were separated from the yellow androstentrione. The latter can also be dissolved out from the mixture of the two substances by extraction with benzene. The white substance forms beautiful prismatic needles (from alcohol), which at 225° C. become discolored and at 248–249° C. melt. The mixed melting point with androstentrione (216–217° C.) is 207–209° C.;

$$[\alpha]_D^{22°} = +54.6° \text{ (in acetone).}$$

The white crystals can be distilled in a high vacuum at 165° C. with decomposition; they are stable to 1 hour boiling with acetic anhydride and in all probability constitute an androstantrione—(3.6.17)—ol—5.

Physiological testing of the 6-oxo-testosterone and cf the Δ⁴-androstentrione-(3.6.17) has shown that in the case of both compounds substances having female characteristics of the physiological activity of the follicle hormone are concerned. 4 x 500 γ 6-oxo-testosterone acetate or Δ⁴-androstentrione produce in the case of castrated female mice after subcutaneous injection in sesame oil solution in the case of 50-60% of the animals full oestrus reaction.

Example 4

1.1 grams of 7-oxo-androstendiol diacetate are treated with 3 grams of distilled aluminium isopropylate and 50 ccs. of absolute isopropyl alcohol. The whole is heated to boiling for 7 hours, a further 50 ccs. of isopropyl alcohol being added after about 4 hours of the heating, and then about 60 ccs. are distilled off with the aid of a Hahnsch apparatus. In the distillate after the addition of hydroxylamine hydrochloride the acetone produced can be determined with N/10 caustic soda lye and accordingly the reduction yield. The flask residue is diluted with ice water and allowed to stand for a long time; then dilute sulphuric acid is added and the whole diluted with water. Thereupon the separated precipitate is filtered off and after drying in benzene is dissolved with the addition of some methanol. The whole is filtered, the solution somewhat evaporated and allowed to crystallise. There is thus obtained the 7-hydroxy-androstendiol diacetate, which exhibits a melting point of 241-242° C.; by saponification the free trialcohol can be obtained therefrom.

Example 5

200 mg. of 7-oxo-androstendiol diacetate are shaken with hydrogen in a shaking vessel with 0.5 gram of previously reduced Raney catalyst in 50 ccs. of alcohol, until 1 mol of hydrogen is taken up. The whole is filtered from catalyst and the filtrate evaporated in vacuum. The residue is taken up in methanol and precipitated with water. The precipitate is reprecipitated from methanol. The 7-oxo-androstandiol diacetate obtained exhibits a melting point of 193-194° C. By saponification there is obtained therefrom the corresponding saturated ketone dialcohol.

Example 6

200 mg. of 7-oxo-androstendiol diacetate are shaken with 0.5 gram of previously reduced platinum oxide catalyst in 40 ccs. of glacial acetic acid in a shaking vessel with hydrogen until 2 mol of hydrogen are taken up. The liquid is filtered from platinum, the filtrate poured into water and extracted with ether. The ethereal solution is washed with N-caustic soda lye and finally with water. The ether is dried with magnesium sulphate and evaporated. The residue is crystallised from dilute alcohol. There is obtained in this manner the 7-hydroxy-androstandiol diacetate and therefrom by saponification with N-methyl alcoholic caustic potash lye the 7-hydroxy-androstandiol.

Example 7

880 mg. of Δ⁵-7-oxo-androstendioldiacetate-3.17 are dissolved in 30 ccs. of absolute isopropyl alcohol. To the hot solution are added about 3 grams of freshly distilled aluminium isopropylate, then the reaction mixture is heated to boiling for 24 hours on a water bath with descending condenser with the exclusion of moisture. After addition of 10 ccs. of 2N methyl alcoholic caustic potash lye the solution is allowed to stand in the hot for a further 30 minutes and then the reaction solution is treated with water and dilute hydrochloric acid and extracted with ether.

From the ethereal solution there are obtained after the distillation of the ether 820 mg. of an oil. This oil is dissolved in 3 ccs. of pyridine and treated with 2 ccs. of benzoyl chloride. After the solution has been allowed to stand for 24 hours an excess of N-sulphuric acid is introduced. The oil which thereby separates, after pouring off the water, is well worked up with alcohol. After repeated precipitation of the product from acetone with alcohol there is obtained the Δ⁵-androstentriol tribenzoate-3.7.17 from acetone in felted needles of melting point 250-251° C.; it exhibits with sulphuric acid a characteristic deep red color.

Example 8

500 mg. of Δ⁵-androstentrioltribenzoate-3.7.17 are subjected to vacuum distillation; thereby benzoic acid splits off. The distillate obtained on further temperature increase exhibits after recrystallisation from alcohol a melting point of 211-213° C. and gives on melting with chloral hydrate a deep blue coloration.

Example 9

200 mg. of Δ⁵-7-oxo-androstendiol-3.17-diacetate are heated for 20 minutes to boiling with 15 ccs. of 2-N-methyl alcoholic caustic potash lye, the reaction solution is thereupon diluted with water and worked up in the customary manner. After recrystallisation from dilute alcohol the Δ³-Δ⁵-androstandienol-17-one-7 crystallises in small plates of melting point 171-172° C. The optical rotation amounts to $$[\alpha]_D^{20} = \text{about } -375° \text{ (in alcohol)}.$$

The absorption spectrum exhibits a maximum at 280μ.

The product yields an acetate which crystallises from alcohol in needles of melting point 220° C.

Of course, various other modifications in the procedure of the process of the present invention may be resorted to within the scope of the appended claims without departing from the principles set forth herein.

The products obtainable according to the present invention constitute from a therapeutic point of view valuable substances; they either themselves possess physiological activity or serve for further working up to physiologically active compounds.

What we claim is:

1. Process for the manufacture of derivatives richer in oxygen of unsaturated compounds of the androstane and pregnane series, wherein unsaturated compounds of the androstane and pregnane series, which possess in a position adjacent to the carbon-to-carbon double bond a methylene group, are subjected to the action of oxidizing agents capable of converting such methylene group into a carbonyl group without protection of the double bond.

2. Process as claimed in claim 1 in which dehydroandrosterone is employed as starting material.

3. Process as claimed in claim 1 in which an oxygen-containing oxidizing compound of hexavalent chromium is employed as oxidizing agent.

4. Process as claimed in claim 1 in which the starting material contains a hydroxyl group which is protected from the action of the oxidizing agent by conversion into such a group as by hydrolysis can again be converted into a hydroxyl group.

5. Process as claimed in claim 1 in which the starting material contains a hydroxyl group which is protected from the action of the oxidizing agent by conversion into such a group as by hydrolysis can again be converted into a hydroxyl group and in which the reaction product is subsequently hydrolyzed to restore the hydroxyl group.

6. Process as claimed in claim 1 in which dehydroandrosterone is employed as the starting material and an oxygen-liberating hexavalent chromium compound as the oxidizing agent.

7. Process for the manufacture of reduction products of derivatives richer in oxygen of compounds of the androstane and pregnane series wherein reducible derivatives richer in oxygen of compounds of the androstane and pregnane series as contain at least 3 oxygen atoms directly connected to the carbon atoms of the androstane or pregnane system are subjected to the action of reducing agents.

8. Process as claimed in claim 7 in which a member of the group consisting of 7-oxo- and 7-hydroxy-androstendiones is employed as starting material.

9. Process as claimed in claim 7, wherein the reducing agent is a compound which is itself capable of giving off hydrogen.

10. Process as claimed in claim 7, wherein the reducing agent is aluminium isopropylate.

11. Process as claimed in claim 7 in which the reducing agent is catalytically activated hydrogen in the presence of a noble metal catalyst.

12. Process for the manufacture of derivatives richer in oxygen of unsaturated compounds of the androstane and pregnane series, wherein unsaturated compounds of the androstane and pregnane series, which possess in a position adjacent to the carbon-to-carbon double bond a methylene group, are subjected to the action of oxidising agents capable of converting such methylene group into a carbonyl group without protection of the double bond and are subsequently subjected to the action of a reducing agent.

13. Process for the manufacture of unsaturated derivatives of the androstane and pregnane series, comprising subjecting a compound of said series having attached to the nucleus a substituent of the class consisting of oxygen, the hydroxy group and groups which on hydrolysis can be replaced by hydroxyl, to the action of an agent capable of splitting off said substituent together with hydrogen while leaving the cyclopentano phenanthrene skeleton intact.

14. Process as claimed in claim 13 in which the splitting off of the said substituent together with hydrogen is carried out by heating to elevated temperatures.

15. Process as claimed in claim 13, wherein reaction products having a substituted hydroxyl group are hydrolyzed to restore the hydroxyl group.

16. Process for the manufacture of unsaturated derivatives of the androstane and pregnane series which comprises subjecting an unsaturated compound of the androstane and pregnane series having a methylene group in a position adjacent to a carbon-to-carbon double bond to the action of an oxidizing agent without protection of the double bond to introduce an oxygen atom into the molecule, and subsequently subjecting the reaction product to the action of an agent capable of splitting off hydrogen and another substituent while leaving the cyclopentano phenanthrene skeleton intact.

17. Process as claimed in claim 16, wherein any hydroxyl groups in the starting material are first converted into groups which on hydrolysis can be replaced by a hydroxyl group, and wherein the reaction product is subsequently hydrolyzed to restore the hydroxyl group.

18. Process for the manufacture of unsaturated derivatives of the androstane and pregnane series which comprises subjecting a keto compound of the androstane and pregnane series having at least two additional oxygen atoms connected directly to the carbon skeleton characteristic of its series, said compound including a substituent of the group consisting of ester, ether and halogen groups, to the action of a reducing agent, and subsequently subjecting the reaction product to the action of an agent capable of splitting off hydrogen and said substituent to introduce a double bond into the compound while leaving the cyclopentano phenanthrene skeleton intact.

19. Unsaturated compounds of the androstane and pregnane series of the general formula $C_{19}H_{24}XYZ$ wherein X is located at the carbon atom 17 and stands for a member of the group consisting of oxygen,

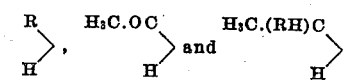

whereas Y is located at the carbon atom 3 and represents a member of the group consisting of oxygen and

R indicating a member of the group consisting of the hydroxyl group and groups that, upon hydrolysis, can be converted into the hydroxyl group, while Z stands for oxygen located at the carbon atom 6 or 7.

20. Compounds of the androstane and pregnane series of the general formula $C_{19}H_mXYZ$ wherein m means 24 or 26 and X is located at the carbon atom 17 and stands for a member of the group, consisting of oxygen,

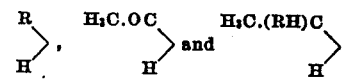

whereas Y is located at the carbon atom 3 and represents a member of the group consisting of oxygen and

while Z is located at the carbon atom 6 or 7 and stands for a member of the group consisting of oxygen and

R indicating a member of the group consisting of the hydroxyl group and groups that, upon hydrolysis, can be converted into the hydroxyl group, the carbon-to-carbon double bond when present being located between the carbon atoms 4 and 5 or 5 and 6.

21. Unsaturated compounds of the androstane and pregnane series of the general formula $C_{19}H_mXY$ wherein m means 24 or 26 and X is located at the carbon atom 17 and stands for a member of the group consisting of oxygen,

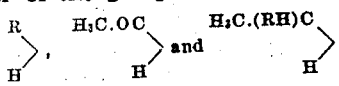

whereas Y is located at the carbon atom 3 and represents a member of the group consisting of oxygen and

R indicating a member of the group consisting of the hydroxyl group and groups that, upon hydrolysis, can be converted into the hydroxyl group, a carbon-to-carbon double bond being located between the carbon atoms 6 and 7 or 7 and 8.

22. Unsaturated compounds of the androstane and pregnane series of the general formula $C_{19}H_mXZ$ wherein $m$ means 24 or 26 and X is located at the carbon atom 17 and stands for a member of the group consisting of oxygen,

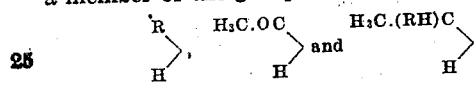

whereas Z is located at the carbon atom 6 or 7 and stands for a member of the group consisting of oxygen and a

group, R indicating a member of the class consisting of the hydroxyl group and groups that, upon hydrolysis, can be converted into the hydroxyl group, a carbon-to-carbon double bond being located between the carbon atoms 2 and 3 or 3 and 4.

23. Process for the manufacture of derivatives richer in oxygen of unsaturated compounds of the androstane and pregnane series, wherein unsaturated compounds of the androstane and pregnane series, which possess in a position adjacent to the carbon-to-carbon double bond a methylene group, are subjected to the action of oxidising agents capable of converting such methylene group into a carbonyl group without protection of the double bond, the reaction product being then treated with a reducing agent and being subsequently subjected to the action of an agent capable of splitting off hydrogen and another substituent to introduce a double bond into the molecule.

24. An unsaturated compound of the androstane and pregnane series having a ketonic group between the 5- and 8- carbons.

25. A compound of the androstane and pregnane series having at a carbon atom, between the 5- and 8- carbons, a substituting group of the class consisting of oxygen and

R indicating a member of the group consisting of the hydroxyl group and groups that, upon hydrolysis, can be replaced by a hydroxy group.

ADOLF BUTENANDT.
WILLY LOGEMANN.